United States Patent [19]

Thayer

[11] Patent Number: 5,425,564
[45] Date of Patent: Jun. 20, 1995

[54] COMBINED TAILGATE AND RAMP

[76] Inventor: Stanley R. Thayer, 864 Hill St., Meeker, Colo. 81641

[21] Appl. No.: 241,998

[22] Filed: May 12, 1994

[51] Int. Cl.6 .................................................. B62D 25/00
[52] U.S. Cl. ........................................ 296/61; 296/57.1
[58] Field of Search .................... 296/61, 62, 50, 51, 296/52, 57.1; 414/537

[56] References Cited

U.S. PATENT DOCUMENTS

| | | | |
|---|---|---|---|
| 3,352,440 | 11/1967 | Wilson | 296/61 X |
| 3,756,440 | 9/1973 | Raap et al. | 296/61 X |
| 3,972,428 | 8/1976 | Love, Jr. et al. | 296/61 X |
| 4,668,002 | 5/1987 | Hanson | 296/61 |
| 4,944,546 | 7/1990 | Keller | 296/61 |
| 5,133,584 | 7/1992 | McCleary | 296/61 |
| 5,211,437 | 5/1993 | Gerulf | 296/61 |

Primary Examiner—Joseph Pape
Attorney, Agent, or Firm—Donald W. Erickson

[57] ABSTRACT

A combined tailgate and ramp for a pickup truck. The tailgate can be removed from the truck and used as a loading ramp. As a ramp, one end of the tailgate is placed on the bumper or bed of the truck. The tailgate is laterally adjustable to form a ramp which accommodates the loading of vehicles having different track sizes or different wheel bases.

3 Claims, 2 Drawing Sheets

COMBINED TAILGATE AND RAMP

BACKGROUND OF THE INVENTION

This invention relates to a dual purpose device that serves as a tailgate for a pickup truck or similar vehicle, as well as a loading ramp. Typical of prior art patents relating to such devices are Bennett, U.S. Pat. Nos. 4,596,417—Combination Loading Ramp and Tailgate Closure Device, Hanson, 4,668,002—Vehicle Tail Gate Ramp Assembly, Gerulf, 5,211,437—Combination Tailgate and Ramp Assembly and Belnap et al., 5,273,335—Truck Ramp/Tailgate.

SUMMARY OF THE INVENTION

This invention is directed at a dual purpose tailgate for a pickup truck and similar vehicles. The tailgate of the present invention pivotally mounts in the original tailgate mounts in the rear of a pickup bed. Latches are provided that are cooperatively received by the original latch mounts or receptacles of the truck bed. The tailgate, as positioned in a truck bed, includes an upper section and a lower section which are divided, horizontally, at about midpoint. The tailgate is constructed from tubular steel, channel iron, steel rods and expanded metal mesh. In use as a loading ramp, the tailgate is simply taken out of the tailgate mounts, one narrow end placed on the bumper of the truck and the other narrow end on the ground, and then the sections moved laterally to extend the sections to the track width needed to accommodate the wheels or track of the item to be loaded in the truck bed. As a precaution, it is good practice to clamp, chain or otherwise affix the tailgate/ramp to the bumper so that it does not fall or slide out of position while loading. After the item is loaded in the truck, the tailgate/ramp is collapsed and re-installed in the pickup as a tailgate. The tailgate/ramp is useful for loading and unloading such items as lawnmowers, all terrain vehicles, snowmobiles and motorcycles.

DETAILED DESCRIPTION OF THE INVENTION

Figure 1:
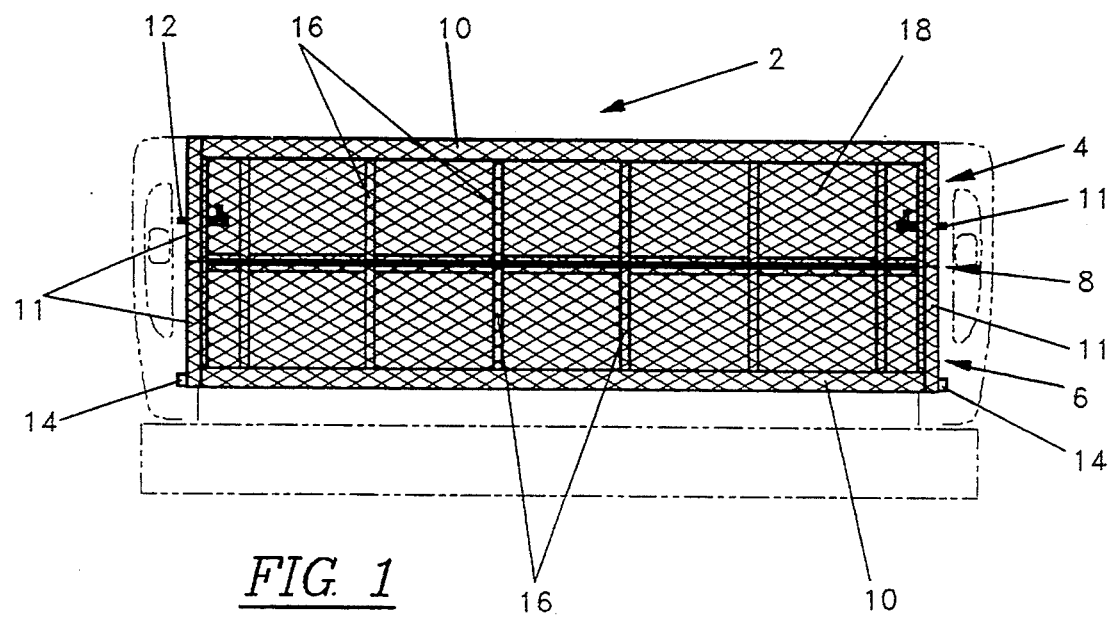
FIG. 1 is a rear elevational view of a dual purpose tailgate installed in a pickup as a tailgate in accordance with the present invention.
Figure 2:
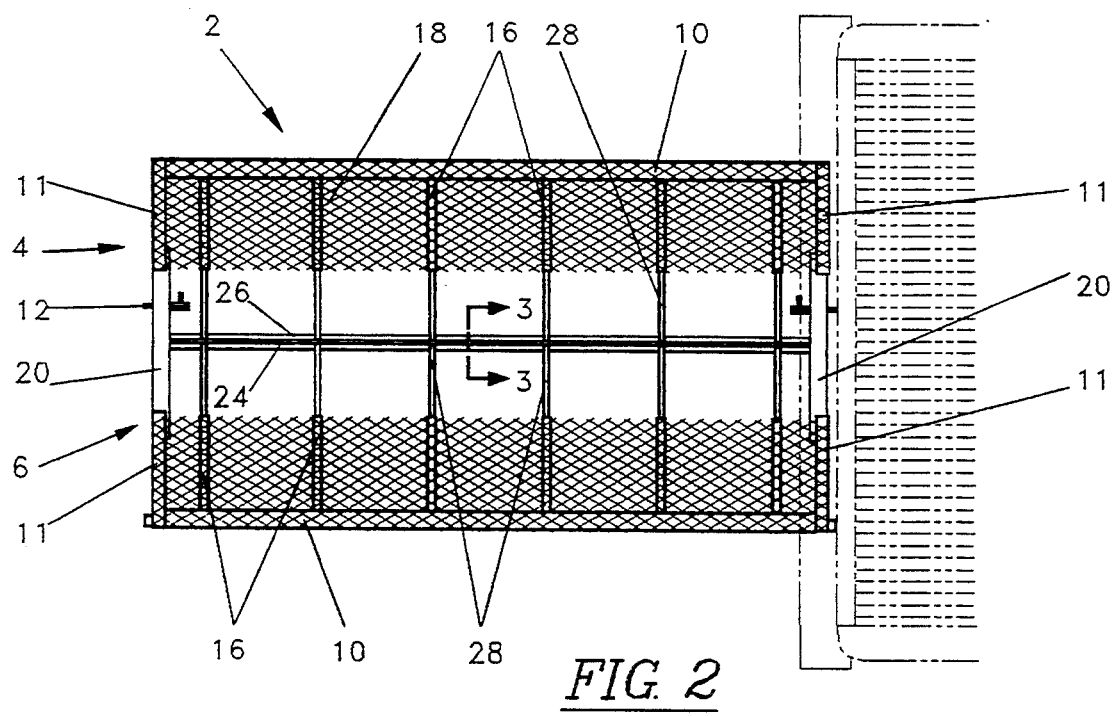
FIG. 2 is a top plan view of the tailgate of FIG. 1 in position for use as a ramp in accordance with the present invention.
Figure 3:
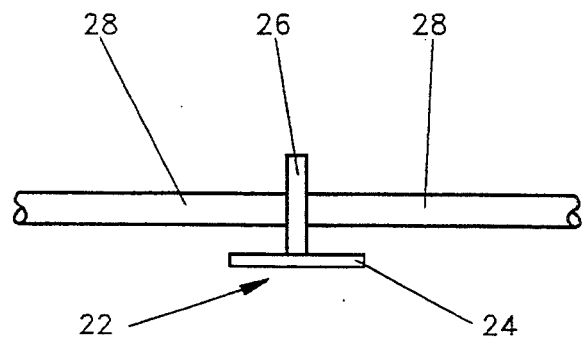
FIG. 3 is a fragmentary cross-section view along lines 3—3 of FIG. 2.
Figure 4:
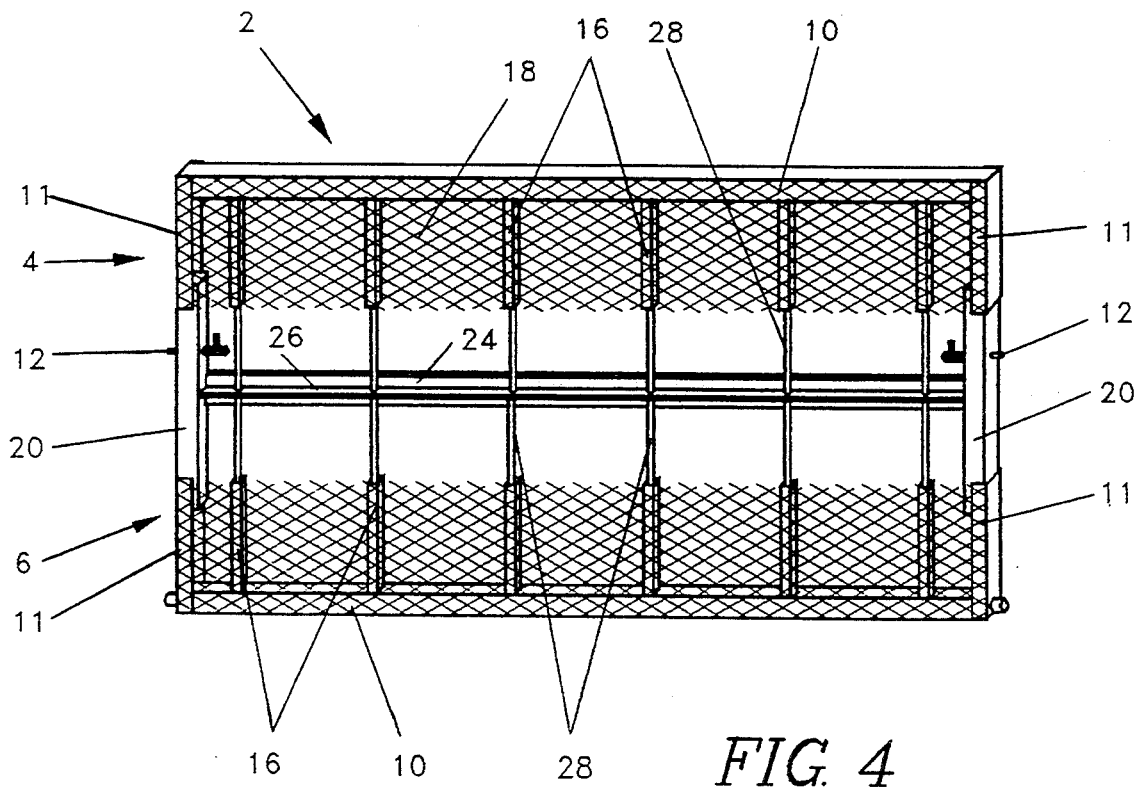
FIG. 4 is a perspective view of a dual purpose tailgate, not installed, in accordance with the present invention.

With reference to the drawings, there is shown a dual purpose tailgate 2 in accordance with the present invention. The tailgate includes an upper section 4 and a lower section 6 which is divided, horizontally, the length thereof at midpoint 8. For a standard pickup, the tailgate measures overall about 22 by 66 inches. In the embodiment shown in FIGS. 1–4, the outer frame is made of 1¼″ square tubing 10 to which, at each end, there is welded 2 inch iron channel members 11. In the upper section 4, there is provided latches 12, which engage the latch mounts or receptacle of the pickup body. The latches can be spring tensioned, not shown, if desired. In the lower section 6, at each end, at bottom, there is provided a slide rod 14 (1¼″ diameter) which pivotally and removably mount in the tailgate mounts of the pickup body. In the upper and lower sections, there is welded a plurality of parallel square steel tubes 16 perpendicular to the top and bottom outer frame member 10. Suitably, the square tubing 16 is ¾ inch. A tire or track supporting surface 18 is affixed to the outer surface of tubing 16 and frame members 10 and 11. In the embodiment shown, the surface 18 is expanded metal. Other materials can be used such as corrugated metal. Expanded metal is preferred because it permits air to pass through it which provides less drag when the tailgate is mounted on the truck. Joining the upper and lower frame members 11, in slidable engagement, is square tubing member 20, best seen in FIG. 2. The square tubing member 20 is 1½ inch. Extending between and perpendicular to members 20 is a T-shaped reinforcing and supporting member 22, best seen in FIGS. 2 and 3. In the embodiment shown, member 22 is formed of 1½ inch by ⅛ inch steel strap 24 and 1½ inch by 3/16 inch steel strap 26. Secured to and perpendicular to T-shaped member 22 are a plurality of parallel spaced ¼ inch cold rolled rods 28 on which cooperatively slide tubing members 16, as best seen in FIG. 2. The tailgate 2 is shown fully extended in FIG. 2 as a loading ramp. It can be, of course, extended to any intermediate position or, not extended at all, in accordance with the requirements of the item being loaded.

The dual purpose tailgate can be made of other materials such as aluminum or good quality plastic or a combination of materials. Similarly, it is possible to use different forms of materials in the construction of the tailgate such as cylindrical tubing instead of square tubing, a single strap member or I-beam member in place of T-shaped member 22, and the like.

What is claimed is:

1. A dual purpose tailgate that serves as a tailgate for and a loading ramp for a pickup truck which comprises:
    a single walled generally rectangular tailgate which is telescopically separable at about midpoint along a horizontal line of the tailgate to define a generally rectangular upper section and a generally rectangular lower section which slidably, cooperatively combine to form a tailgate or a loading ramp, each section having a plurality of telescopically fitted, parallel spaced apart support members perpendicular to the top and bottom edge of said upper section and lower section, means affixed to said support members to provide a tire or track supporting surface on each section;
    reinforcing and supporting means between said upper and lower section which supports said upper and lower section to form a tailgate or loading ramp;
    means in said lower section for pivotally and removably mounting said tailgate in the rear of a pickup truck; and
    means in said upper section to releasably hold said tailgate in place when mounted in the rear of a pickup truck.

2. The tailgate according to claim 1 where said tire or track supporting surface is expanded metal.

3. The tailgate according to claim 1 wherein said spaced apart support members are square tubular steel.

* * * * *